United States Patent
Sclar et al.

(10) Patent No.: US 10,506,248 B2
(45) Date of Patent: Dec. 10, 2019

(54) FOREGROUND DETECTION FOR VIDEO STABILIZATION

(71) Applicant: Facebook, Inc., Menlo Park, CA (US)

(72) Inventors: Melanie Sclar, Menlo Park, CA (US); Amit Puntambekar, Fremont, CA (US); Michael Hamilton Coward, Solano Beach, CA (US); Wurzel David Parsons-Keir, Woodinville, WA (US)

(73) Assignee: Facebook, Inc., Menlo Park, CA (US)

( * ) Notice: Subject to any disclaimer, the term of this patent is extended or adjusted under 35 U.S.C. 154(b) by 17 days.

(21) Appl. No.: 15/395,983

(22) Filed: Dec. 30, 2016

(65) Prior Publication Data

US 2018/0007381 A1  Jan. 4, 2018

Related U.S. Application Data

(60) Provisional application No. 62/357,168, filed on Jun. 30, 2016.

(51) Int. Cl.
| | |
|---|---|
| *H04N 19/513* | (2014.01) |
| *H04N 19/176* | (2014.01) |
| *H04N 19/172* | (2014.01) |
| *H04N 19/40* | (2014.01) |
| *G06K 9/62* | (2006.01) |
| *H04N 5/232* | (2006.01) |
| *G06T 9/00* | (2006.01) |
| *H04N 19/139* | (2014.01) |

(Continued)

(52) U.S. Cl.
CPC ....... *H04N 19/513* (2014.11); *G06K 9/00677* (2013.01); *G06K 9/6269* (2013.01); *G06K 9/6274* (2013.01); *G06T 9/002* (2013.01); *H04N 5/23264* (2013.01); *H04N 5/23267* (2013.01); *H04N 19/102* (2014.11); *H04N 19/139* (2014.11); *H04N 19/167* (2014.11); *H04N 19/172* (2014.11); *H04N 19/176* (2014.11); *H04N 19/40* (2014.11); *H04N 19/46* (2014.11)

(58) Field of Classification Search
CPC .......... H04N 19/00945; H04N 19/172; H04N 19/176; H04N 19/513; G06T 5/003
See application file for complete search history.

(56) References Cited

U.S. PATENT DOCUMENTS

| | | | |
|---|---|---|---|
| 6,707,940 B1 * | 3/2004 | Qian | ....................... G06T 5/002 382/173 |
| 2008/0033508 A1 * | 2/2008 | Frei | .................... A61B 5/04001 607/62 |

(Continued)

OTHER PUBLICATIONS

U.S. Appl. No. 15/396,025 by Sclar, M., et al., filed Dec. 30, 2016.

*Primary Examiner* — Obafemi O Sosanya
(74) *Attorney, Agent, or Firm* — Sheppard Mullin Richter & Hampton LLP

(57) ABSTRACT

Video foreground and background detection is performed on a received video sequence on a macroblock by macroblock basis using motion vector encoding information associated with each macroblock. Some of the macroblocks in each frame, for example, edge or corner macroblocks, may be exempt from the foreground and background detection. The detection information, along with the video data, is passed to an image stabilization algorithm that prepares the video for subsequent video compression.

17 Claims, 7 Drawing Sheets

(51) Int. Cl.
*H04N 19/46* (2014.01)
*H04N 19/102* (2014.01)
*H04N 19/167* (2014.01)
*G06K 9/00* (2006.01)

(56) References Cited

U.S. PATENT DOCUMENTS

2011/0150093 A1\* 6/2011 Mangiat .................. G06T 5/003
 375/240.16
2013/0279598 A1\* 10/2013 Gomes ................... H04N 19/23
 375/240.24

\* cited by examiner

FOREGROUND DETECTION FOR VIDEO STABILIZATION

CROSS-REFERENCE TO RELATED APPLICATIONS

This application claims the benefit of commonly assigned U.S. Provisional Patent Application Ser. No. 62/357,168, filed on Jun. 30, 2016, and entitled "FOREGROUND DETECTION FOR VIDEO STABILIZATION," the disclosure of which is hereby incorporated herein in its entirety by reference.

TECHNICAL FIELD

This patent document relates to video and image processing, and in particular, relates to video stabilization and compression.

BACKGROUND

Universal availability of digital video cameras and storage products has enabled new uses of digital video. In contrast to the traditional network delivery of video (e.g., digital satellite or cable television), an increasing amount of video is being captured by users using their cameras and smartphones and shared over the Internet with others.

Although the availability of Internet-connected video capturing devices (e.g., mobile computing devices) has soared, the ability of these devices to encode, or compress, and upload the captured audio/video content remains limited. Furthermore, these devices, such as Internet-connected cameras, tablets and smartphones, may frequently be offline and thus rely on a service provider to make content captured from the devices available to others at the time and place others want to view the content. As an example, users may employ a social networking service to share their videos.

These videos can be encoded by mobile computing devices, for example, prior to an upload process to a server computing device, or by a server computing device of the social networking service, for example, prior to a download process to mobile computing devices.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
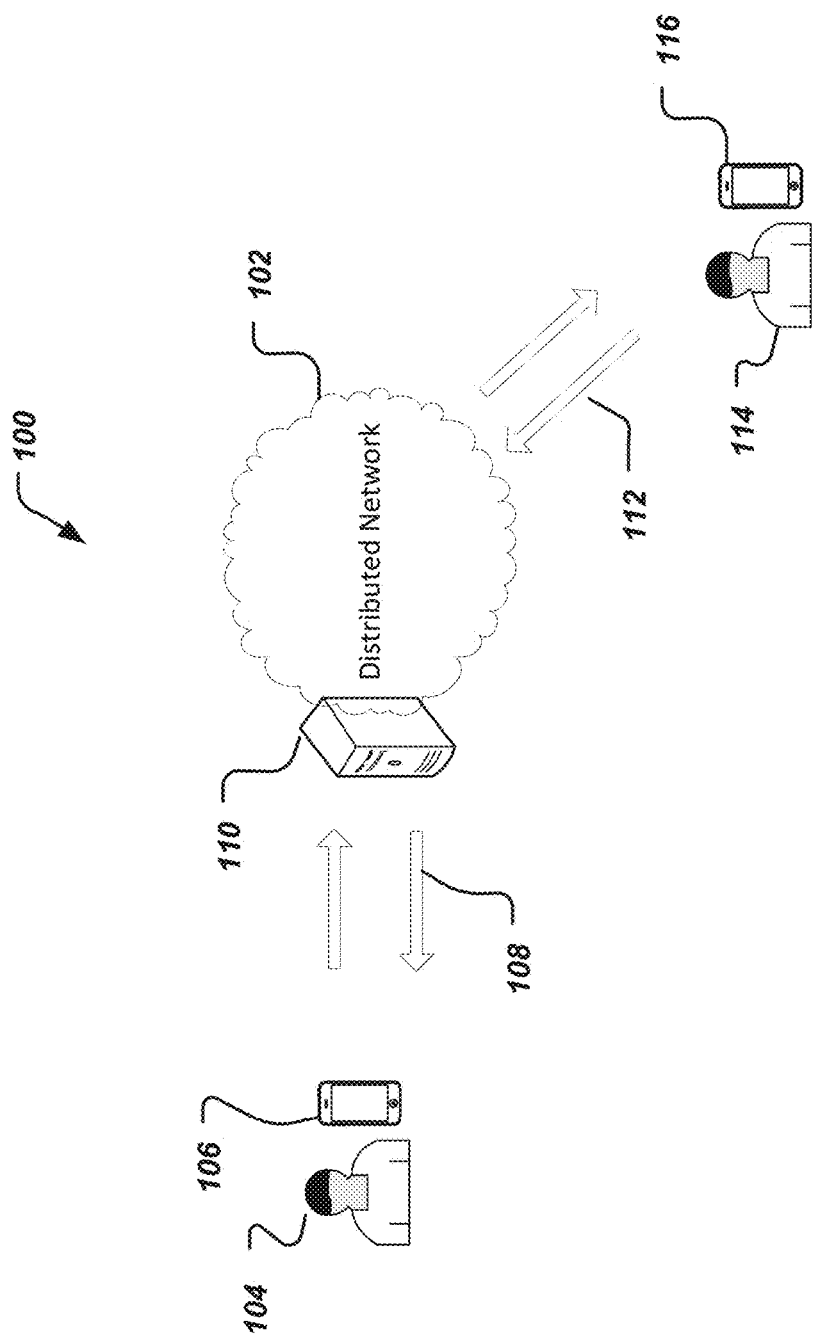
FIG. 1 is a block diagram illustrating an example of a communication network for video uploading and sharing, consistent with various embodiments.

Although the flow and sequence diagrams presented herein show an organization designed to make them more comprehensible by a human reader, those skilled in the art will appreciate that actual data structures used to store this information may differ from what is shown in that they, for example, may be organized in a different manner, may contain more or less information than shown, may be compressed and/or encrypted, etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Embodiments are described for a sequence of video frames is analyzed using a technique to categorize macroblocks of each video frame as belonging to either foreground or background. A video stabilization algorithm subsequently processes only the background macroblocks for stabilizing the sequence. Some macroblocks may be exempt from the categorization process and may always be used (or not used) for the stabilization step.

Embodiments are described for a neural network is trained to select a video stabilization algorithm and parameter settings to use with a video stabilization algorithm based on a "fingerprint" of a target video sequence that is to be stabilized. The selection process may take into consideration various optimization parameters, such as the time budget for the completion of the stabilization task, a fingerprint of the video and device gyro and movement parameters.

The workflow of users capturing video sequences using user devices, storing the captured video sequences on the user devices in compressed or encoded video formats, uploading from user devices to the network-side, and making the video available for download from the network-side to users may be computationally intensive and may use valuable resources such as network bandwidth, processing time and storage. Furthermore, user satisfaction may also depend on the responsiveness of a service, e.g., how quickly a video can be uploaded and made available for download by the user's friends in distant places.

Video compression, re-encoding and transcoding operations could be computational intensive and quality improvements in video encoding, e.g., reduction in the amount of processing time or resources could significantly impact the above-outlined workflow and improve user satisfaction. One such technique adopted by some implementers includes pre-processing video sequences uploaded by users prior to re-encoding by the network to make the video sequences more amenable to subsequent video encoding or compression. Many video compression techniques exploit relative changes and movements in visual content between successive video frames, and generally exhibit better speed, size or quality performance when inter-frame changes are lower.

Using video stabilization, for example, by removing some amount of inter-frame motion or jerkiness, is one technique that has received some attention. For example, some public domain implementations are available to help implementers identify and eliminate jerkiness in video. A public domain software package, called "vid.stab," for example, is a plug-in available for Linux implementations of video transcoding. Such implementations and technique, however, could suffer from certain implementation drawbacks. For example, without careful planning and implementation, the complexity and resource requirement of a video stabilization implementation could defeat the very reason for using it to improve implementation efficiency. Furthermore, visually incorrect video stabilization may in fact end up degrading visual quality of a compressed video from a human user perspective. VShake is another example of a public-domain software solution available for video stabilization.

The techniques described in the present document can be used, among other benefits, to achieve low-complexity and reliably high visual quality video compression, or transcoding. In one example aspect, the disclosed techniques can be used to analyze video sequences to identify video foreground and background and proportionally applying video stabilization to different regions to improve performance of the overall video compression and stabilization operation. In another aspect, the foreground analysis may be performing without having to perform expensive motion estimation and by simply analyzing certain statistics already available with the input video sequence that is being stabilized. In yet example aspect, the foreground analysis, and the subsequent encoding processes could be continually trained and improved using various visual quality metric and automatic and/or user feedback.

These, and other aspects, are described in this document.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example Network Topology

Turning now to the figures, FIG. 1 illustrates an example of a communication network 100 in which a distributed network 102 is operating to facilitate the use of digital video among multiple users: user 104, who may be the originator of a video using his user device 106, and users 114 with their user devices 116, who may download and view the video sequence that the user device 106 uploads to a server 110 in the distributed network 102. The user devices 106, 116 may communicate with the distributed network 102 via communication networks or channels 108, 112. The channels 108, 112 may be the same or different networks (e.g., the Internet or World Wide Web) and may change from time to time based on location. For example, user devices 106, 116 may include multiple network modules (e.g., a Wi-Fi modem, a 3G modem, a 4G modem, a WiMAX modem, etc.) and may use one or more of the network connections for communication in the upstream direction (from the device to the network) or the downstream direction (from the network to the device).

In one example use case, the user 104 may capture a video sequence using a camera-enabled smartphone (user device 106). The user 104 may then instruct the user device 106 to upload the video to the server 110, which may be a server operated by a service provider (e.g., a social media website). Once the user device 106 uploads the video to the server 110, the service provider may operate the distributed network 102 (e.g., a geographically distributed server farm) to propagate the availability of the user's video clip to other users with whom the user 104 wishes to share the video clip, for example, user 114.

As live streaming is becoming very successful, it becomes more and more important to have quality footage served to the users with short turnaround time between when the a video is captured and when it becomes available for viewing. To this end, a user's video being served to her social contacts from the network should be of a reasonable size and quality such that it can be served in real time to the requesting uses.

As previously discussed, video stabilization may be used to pre-condition the video for more compact representation, which then in turn makes it easier to share and stream the video during subsequent use.

Since video stabilization could be useful to improve the quality of footage given to users, in some embodiments, every video sequence received by a video service provider's video server may be processed for stabilization prior to serving back to users. A brute-force implementation may stabilize videos that do not require stabilization. This may generate a bad experience for the user by degrading quality or by slowing down availability of video. Often, video processing involves two different phases—a first analysis phase followed by a second stabilization phase. Taking advantage of the fact that the algorithm has two phases, it may be possible to decide whether it is worth running the second phase of algorithm based on results of analysis on the first one.

In some embodiments, the first phase generates a file with relative translation and rotation transform information about subsequent frames, and the second one executes these transformations. For many video frames, it may not be necessary to stabilize. The file may contain a list of motion vectors for each frame, and the second phase could analyze each one of them to decide if the video is shaky based on the type of movement they have. The problem with this approach could be that the image could have moving subjects that resemble shakiness, and may generate false positives.

To address this issue, in some embodiments, a foreground/background detection technique is used to only consider the motion vectors outside of this area (i.e., in the background). That way, the second phase could focus just on seeing if the background is shaky by analyzing motion vectors: if the vector is moving back and forth at a high speed it's a good indicator of shakiness, but if it's moving smoothly in a direction then it may be considered acceptable movement by the user. This application of the foreground detection algorithm could remove many of the vectors to analyze and keep only the most relevant ones, thereby gaining computational and operational efficiency.

Furthermore, the second phase that performs video stabilization could be made self-training such that the more videos pass through the video stabilization phase, the smarter the decision making about which portions of the video to stabilize and which ones to exempt or skip from stabilization. In some embodiments, a neural network to learn to detect what would be the optimal parameters for stabilization for each video may be used. To train the neural network, certain visual characteristics of video sequences may be abstracted in the form of "a fingerprint" of the video and success of various stabilization and compression strategies may be tracked by the neural network using the fingerprint.

In some embodiments, neural network training may be performed offline. After training the neural network offline, the neural network may produce optimal parameters to use during the encoding of the video. Ideally, it could also return more than one winning option, and it could return a different solution depending on operational scenarios, as described herein.

For example, in some use cases, the relative motion of the user capturing video and the scene being captured may influence the stabilization parameters that may best stabilize the video. For example a video of a near object taken while sitting down and a video taken of a far moving object from a fast moving car may appear to have same shakiness or instability.

In some embodiments, a video server may first try to figure out how shaky the video sequence is and then decide on whether or not to apply video stabilization and to which sub-sections of the video sequence to apply the stabilization. For example, if the camera shakes quite a bit, stabilization may only be applied to a zoomed in portion of the video where camera shaking is relatively lower and stabilization may improve video quality after re-encoding.

For example, in some cases the camera may be very predictably moving around and then there is good correlation between how the camera is moving and how the video environment is changing. Skiing could be a second example which off-the-shelf video stabilization algorithms generally work well. By contrast, in a case where a user is recording moving pictures on a computer screen, and there might be text (e.g., menus and display messages) jumping all over the screen. The text changes place within the video frame not because of camera shakiness, but due to design. Many of the existing algorithms read that as a place where the text is stable and the camera is moving and distort stabilization altogether. In such cases, it would be desirable to turn off stabilization when the foreground text is deliberately moving.

In some embodiments described herein, stabilization priorities are identified for different video frame areas, e.g., based on foreground-background classification and video stabilization is selectively applied (or not) to such areas.

Figure 2:
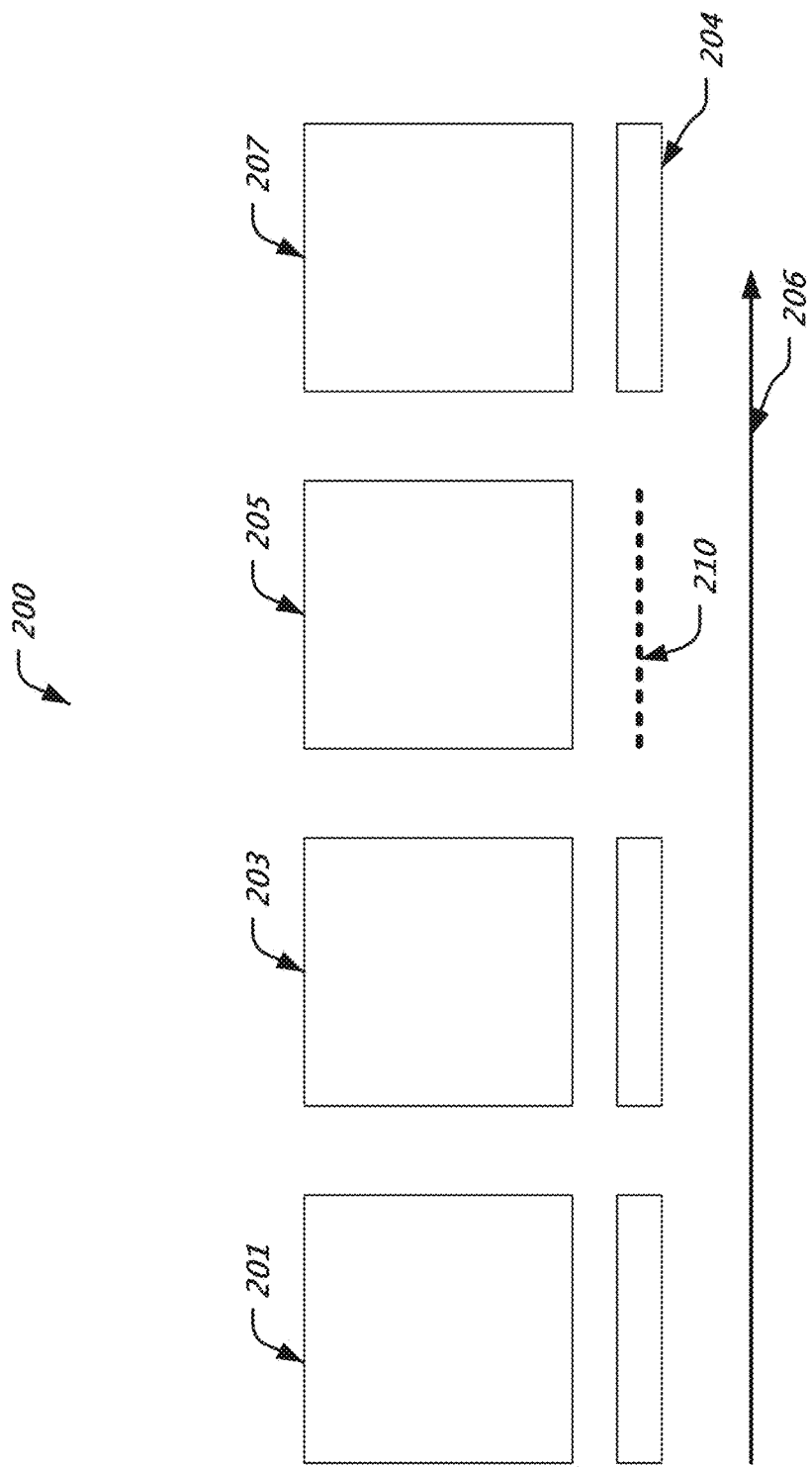
FIG. 2 shows an example of a video sequence uploaded from a user device to a network.

FIG. 2 shows an example of a video sequence 200 uploaded from a user device to a network. The video sequence 200 may comprise multiple video frames or pictures, 201, 203, 205, 207 along a timeline 206. Video is often, but not always, captured by user devices at a constant frame rate, for example, 30 or 60 frames per second. Depending upon the use case, user device and network capability, the video frames may be uncompressed (e.g., for broadcast or contribution quality contribution), lightly compressed (e.g., professional quality contribution) or highly compressed (e.g., social media and such application). Various video encoding technologies such as intra encoding (JPEG, JPG2000, GIF, TIFF, etc.) could be used. However, in most widely used user devices such as mobile phones, pads and laptops, it is quite common to use an inter-frame encoding scheme such as MPEG-4, H.264, High Efficiency Video Coding (HEVC), WP, and so on.

In some embodiments, at least some of the video frames may include metadata information, or non-visual information 204, which, as described in this document, could be advantageously used for video stabilization and/or subsequent encoding or compression. Metadata information need not be included which each video frame (e.g., no metadata is included with frame 205, as indicated by 210). The metadata may be implicitly included with the video frames or may be explicitly included with the video frames. Implicit metadata may be calculated by analyzing the video frames and may include, e.g., number of macroblocks encoded as inter, or intra or another type, range of motion vectors used, quantization parameters used, and so on.

Explicit metadata may include user device parameters and sensor readings such as location, speed, direction of movement of the device, type of the device, user settings used during the video capture, and so on. This document describes several embodiments to advantageously use such information for improving quality of encoded video.

Figure 3:
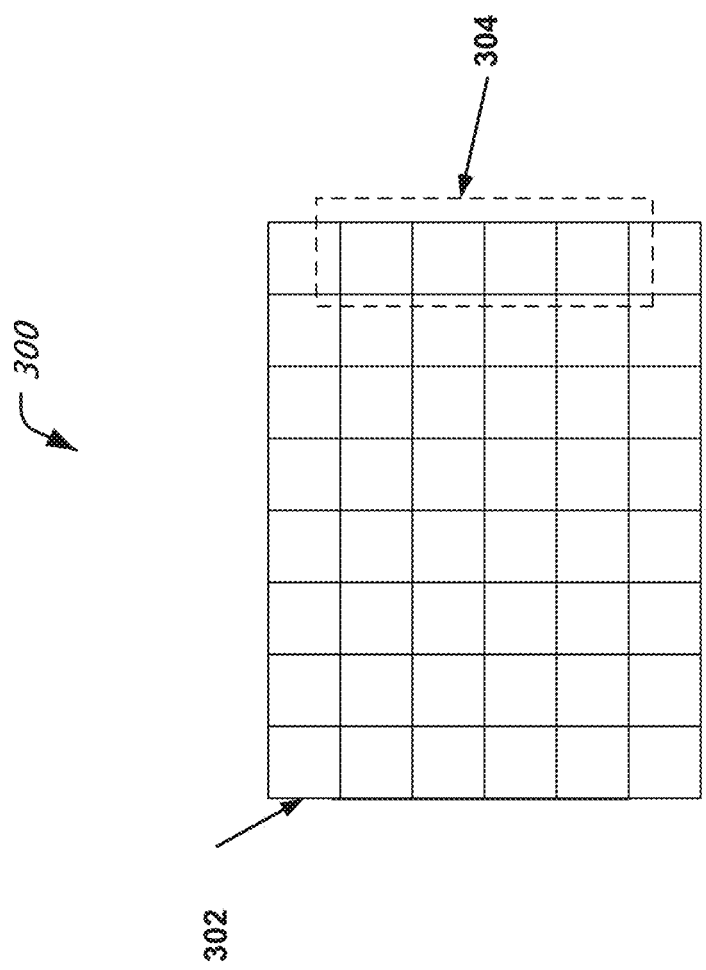
FIG. 3 shows an example video frame in a video sequence.

FIG. 3 shows an example video frame 300 (similar to video frames 201, 203, 205, 207) in a video sequence. Only for illustration, video frame 300 is shown to have six rows of eight macroblocks each. Of course, one of skill in the art would readily understand the relationship between pixel resolution of a video frame, size of macroblocks and total number of macroblocks in a video frame. A macroblock is often used as a basic unit of encoding and may be associated with zero, one or more motion vectors and such. In the present document, the various embodiments are described with reference to macroblock based video encoding, but it would be understood that the discussion similarly extends to other logical video encoding units such as coding blocks, and in general may have different sizes and/or shapes. For example, corner macroblock 302 and edge macroblocks 304 may have different (or same) pixel widths, based on the encoding algorithm used for the video frame 300 and/or logical grouping for subsequent video stabilization, as described herein.

Figure 4:
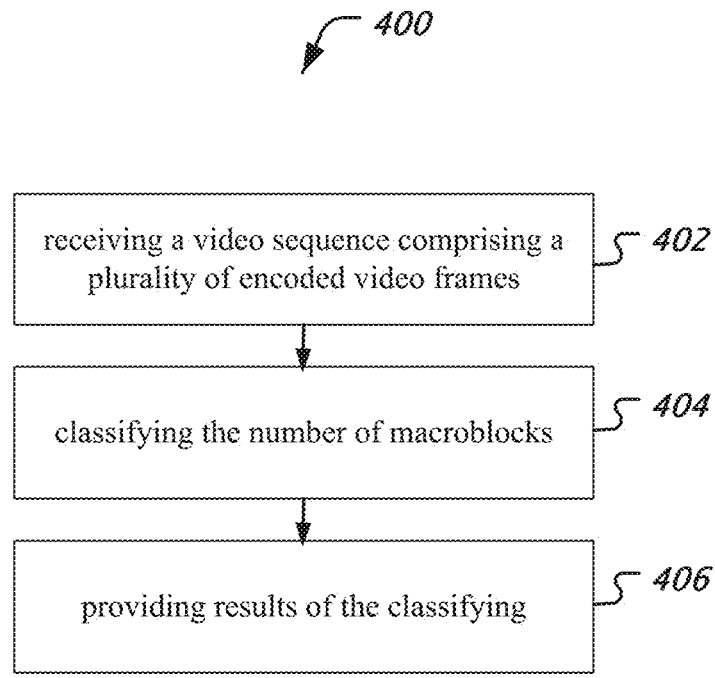
FIG. 4 is a flow diagram for a method of processing video.

FIG. 4 is a flowchart depiction of a method 400 of processing video. The method 400 may be implemented at one or more computer platforms in the distributed network 102.

The method 400 includes, at 402, receiving a video sequence comprising a plurality of encoded video frames, wherein each encoded video frame includes a number of macroblocks and motion vector information associated with the number of macroblocks.

The method 400 includes, at 404, classifying the number of macroblocks as being one of a background macroblock, a foreground macroblock, and an exempt macroblock; wherein, from a perspective of a viewer of the video, the background macroblock appears as being in background and the foreground macroblock appears as being in front of a visual rendering of the video.

In some embodiments, a net vector of motion may be evaluated between consecutive frames of a video sequence to determine which way the content and objects within video are generally moving. This information may be used to select an appropriate video stabilization algorithm, for example, between one of a publically available VShake and Vid.Stab algorithms, based on type of movement (high, low, straight, circular, etc.) and a priori knowledge about which stabilization algorithm works better for each situation.

The method 400 includes, at 406, providing results of the classifying, along with the video sequence, to a video stabilization stage in which video is stabilized based on the results of the classifying.

In some embodiments of the method 400, an edge macroblock that is positioned on a peripheral border of a video frame may be classified as being an exempt macroblock for which no stabilization is to be performed by the video stabilization stage.

In some embodiments, video stabilization may only be performed on background macroblocks, while refraining from altering foreground macroblocks and exempt macroblocks.

One reason to not perform video stabilization on a foreground macroblock or an edge macroblock is that, often, video quality may not improve or may degrade. For example, video taken by a user while dancing or jumping may look worse in foreground areas after stabilization is applied. Therefore, operating the video stabilization stage by refraining from using foreground macroblocks may speed up video processing and save computational power.

In some embodiments, operating the video stabilization stage on background macroblocks, and at least some foreground macroblocks. For example, some foreground macroblocks may be classified as having "low" motion and may be processed if the video stabilization stage has computational budget (time or resources) left to finish a job in real time.

In some embodiments, corner macroblocks may be exempt from video stabilization because their motion vectors may exaggerate motion and there may not be additional corrective information because neighboring macroblocks of corner macroblocks are absent from the video frame.

In some embodiments, device capture information, e.g., contained in the previously mentioned metadata, may be used to classify macroblocks and decide whether or not to perform video stabilization. For example, device gyro information may be received and a check may be made about how fast the device was moving when the video sequence was captured. In some embodiments, a higher gyro speed may tend to favor classification of a macroblock as a foreground macroblock, e.g., the macroblock may be classified to not perform video stabilization on it. Alternatively or additionally, a given macroblock is more likely classified as a background macroblock when the gyro information indicates a lower speed of movement of the device when the foreground macroblock was captured.

In some embodiments, user devices may capture and send sensor data to help the video stabilization. For example, if the gyroscope data indicates that there is movement, and fingerprint reflects the movement, then the readings are consistent. Otherwise, if movement indication from fingerprint and gyroscope are contradicting, then an error may be noted and error correction, e.g., skipping video stabilization, may be used.

In some embodiments, for computational efficiency, fingerprinting may be calculated on intermittent basis such as once every 5 or so seconds. The period of calculation may be adjusted by monitoring quality of subsequently stabilized and compressed video.

In some cases, macroblocks may not have any motion information associated with them. This may happen when there is data missing or when a macroblock is encoded using intra, skipped or similar options. In some embodiments, such macroblocks may be classified based on neighboring macroblock decisions. For example, the macroblock decision for a neighboring macroblock in the general direction of content flow may be used.

In some embodiments, geographic information, such as GPS coordinates of the capture device, may be received and analyzed to make a determination about whether the video sequence was captured indoors or outdoors in a place where there is a higher chance of the user being mobile and video being inherently more shaky. In some embodiments, the foreground/background classification may tend to favor in the direction of foreground classification when video sequence was an outdoor video.

In some embodiments, a method of analyzing a video sequence may include receiving a video sequence comprising a plurality of encoded video frames, wherein each encoded video frame includes a number of macroblocks and motion vector information associated with the number of macroblocks, identifying at least a directionality of relative movement between consecutive ones of the plurality of video frames, associating, using the directionality, a priority of a subsequent video stabilization with at least some of the number of macroblocks, and providing results of the classifying, along with the video sequence, to a video stabilization stage in which video is stabilized based on the results of the classifying. In some embodiments, the subsequent video stabilization stage may only be operated on a subset of macroblocks having a specific associated priority. For example, the "foreground" and "background" classification may be one way of associating priorities. In some embodiments, priorities may include "high" "low" "medium" desirability of stabilization, and so on.

Figure 5:
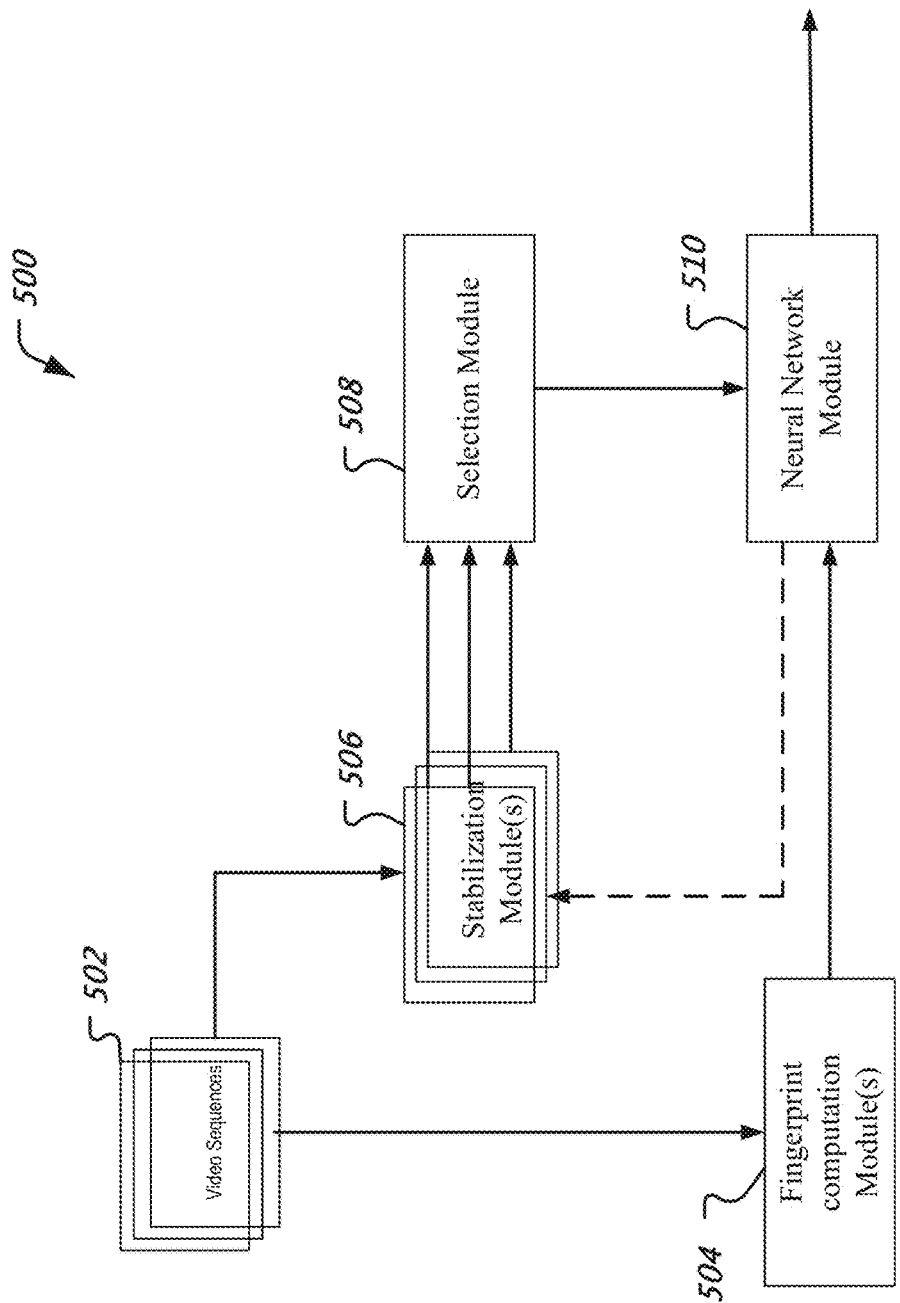
FIG. 5 is a block diagram of an example of a video stabilization system.

FIG. 5 is a block diagram depiction of an example embodiment of a video stabilization system 500.

Multiple video sequences 502 may be used by the system 500 for performing various operations, as described herein.

One or more fingerprint computation modules 504 may computer one or more fingerprints of the video sequences 502. Various embodiment of fingerprinting computation module operations are described with respect to the method 600.

One or more stabilization modules 506 receive the video sequences 502 and perform stabilization processing of the video sequences. Various stabilization algorithms, proprietary or public domain may be used and the number and complexity of such modules could be changed on-the-fly.

A selection module 508 receives results of stabilization module(s) 506 and makes a determination of effectiveness of the various stabilization algorithms executed by the stabilization modules 506. In some embodiments, the determination may be based on a subsequent compression of the video, followed by a video quality measurement using automated, semi-automated or a human user's feedback.

The results of the fingerprint computations from the fingerprint computation module 504 and the selection from the selection module 510 may be input to a neural network module 510, which may train itself to recognize relationships between fingerprints and effectiveness of the stabilization.

In some embodiments, various candidate stabilization processes implemented by the stabilization module 506 may be based on feedback from the neural network module 510. Various operational scenarios of the above-described modules are described with reference to the method 600.

Figure 6:
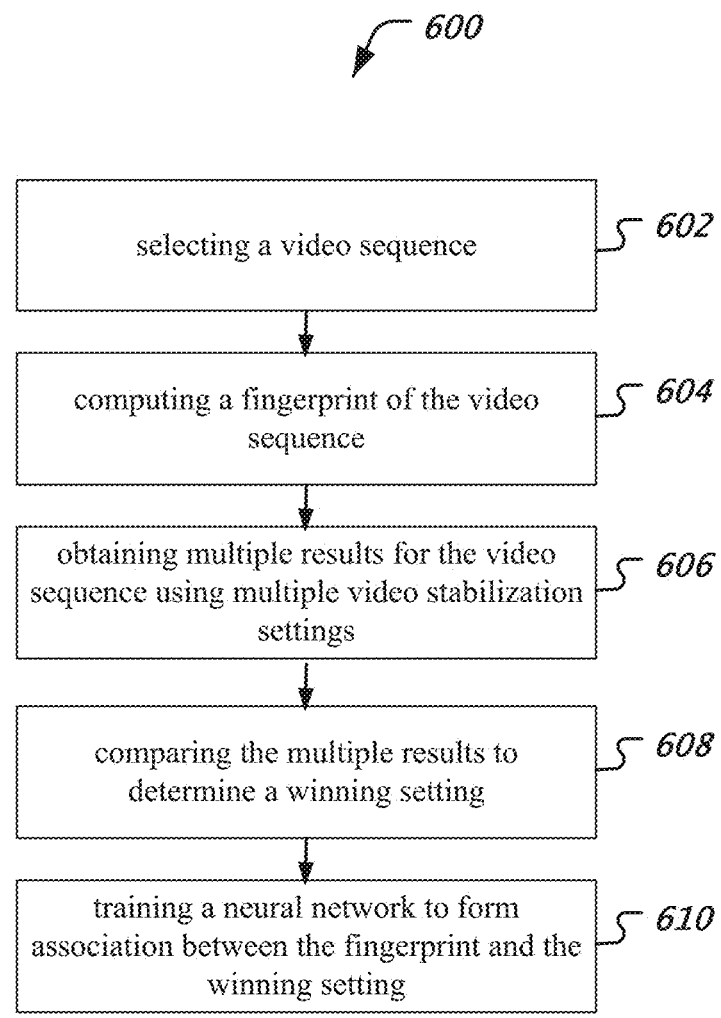
FIG. 6 is a flow diagram for a method of performing stabilization of a video sequence.

FIG. 6 illustrates an example flowchart for a method 600 of performing video stabilization of a video sequence. The method 600 may be implemented to improve compressibility of the video sequence.

The method 600 includes, at 602, selecting a video sequence comprising a plurality of encoded video frames, wherein each encoded video frame includes a number of macroblocks and motion vector information associated with the number of macroblocks.

The method 600 includes, at 604, computing a fingerprint of the video sequence, wherein the fingerprint includes a set of parameters indicative of visual properties of the video sequence relevant to stabilization.

In some embodiments, the fingerprint may numerically represent a measure of motion characteristics within a video frame and/or between video frames of the video sequence. For example, in some embodiments, the fingerprint may be responsive to a ratio of number of I, P, B frames in a video group of pictures (or the entire sequence). In some embodiments, the fingerprint may be a function of intra and inter-coded macroblocks within a frame, and may implicitly include information about how complex that frame is and how much is it moving and how much is it moving in x and y direction and how much is it rotating.

In some embodiments, the fingerprint value may be a function of rotation of content or object within consecutive video frames. In some embodiments, a determination may be made about how much content is rotating from one frame to next and how much translation motion the content is undergoing from one frame to next. In some embodiments, this determination may simply be based on the maximum, or average x and y values of macroblock motion vectors within the frames In some embodiments, fingerprint of a vide sequence may have GOP-level granularity. In other words, each frame within a GOP may have identical fingerprint value, and this value may change from one GOP to another within a video sequence. In some embodiments, the fingerprint may comprise two numbers: one number is the ratio of I, P, B frames and the other number is a measure of complexity.

In some embodiments, a minimum video sequence duration rule may be enforced before fingerprint for a video sequence is changed. For example, in some situations, e.g., abrupt scene changes, video GOPs may be short, e.g., less than 1 second in duration. In such cases, frequent changes in fingerprint values, which may lead to frequent switching in the subsequent stabilization algorithms, may cause objectionable visual artifacts. A time duration of 1 to 2 seconds may be a suitable minimum duration for such embodiments. Such a use of hysteresis may advantageously suppress or eliminate sudden quality changes in the compressed video output.

In some embodiments, the fingerprint value may be a function of determining a number of scene changes in the video sequence. In some embodiments, the fingerprint value may be a function of calculating a number of intra, predictive or bi-directional predictive frames in the video sequence. In some embodiments, the fingerprint value may be a function of statistical distribution of foreground and background macroblocks in the video sequence.

In some embodiments, the pre-defined fingerprint syntax may be in a type-length-value format (TLV) and the results may be stored such that the type field is indicative of a characteristic of the video sequence, the length field is indicate of a storage size of the characteristic and the value field is indicative of a value of the characteristic. This format may advantageously allow future additions to the enrichment of fingerprint using the well-known TLV syntax.

In some embodiments, the fingerprint may be a fixed byte length record and may be stored in a fixed size array, e.g., 3 to 64 bytes in length. Such a compact representation of fingerprint may be useful in achieving real-time performance by speeding up software processes, or by using dedicated hardware circuitry, to make fast decisions about video stabilization and re-encoding strategy in the subsequent processing.

The method 600 includes, at 606, obtaining multiple results for the video sequence using multiple video stabilization settings using either different parameter settings of a video stabilization algorithm or different video stabilization algorithms. For example, various parameter settings of various video stabilization algorithms could be used.

The method 600 includes, at 608, comparing the multiple results to determine a winning setting. In some embodiments, the comparison may be performed by first transcoding the video sequence and then measuring visual quality of the transcoding video output. In various embodiments, the automated (e.g., SSIM) or semi-automated or human-feedback based video quality measurement techniques may be used.

The method 600 includes, at 610, training a neural network to form association between the fingerprint and the winning setting. The neural network may also be used to provide input to the fingerprinting process based on the associations formed by the neural network, e.g., about which fingerprint strategies are showing strong correlations with the corresponding visual quality results.

In some embodiments, the neural network may autonomously perform self-training by performing quality monitoring of how the neural network itself is working over a period of time. The neural network may not only track video quality but also resource utilization, real-timeness of the implementation, and so on.

Computer System

Figure 7:
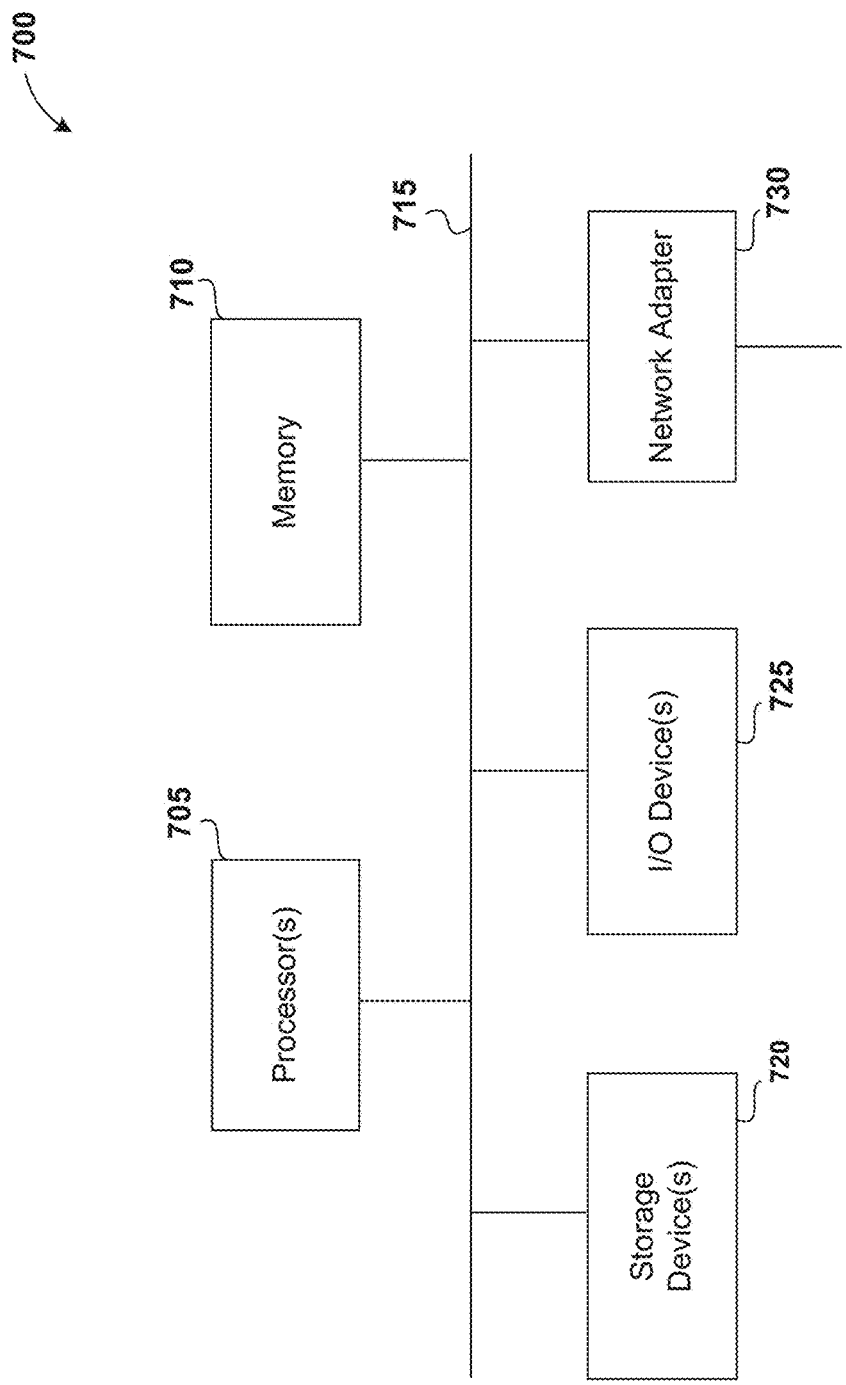
FIG. 7 illustrates an example computing device, consistent with various embodiments.

FIG. 7 is a block diagram of a computer system as may be used to implement features of some of the embodiments, for example, master nodes or worker nodes, as described herein. The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 710 and storage devices 720 are computer-readable storage media that may store instructions that implement at least portions of the various embodiments. In addition, the data structures and message structures may be stored or transmitted via a data transmission medium, for example, a signal on a communications link. Various communications links may be used, for example, the Internet, a local area network, a wide area network, or a point-to-point dial-up connection. Thus, computer readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

In some embodiments, a user device may include at least a memory, a processor and a network interface. The memory may store instructions that, when executed by the processor, cause the processor to transmit encoded video over the network interface. The instructions may include instructions for performing a video compression operation and producing encoded video frames, instructions for transferring the encoded video frames over the network interface at a present output frame rate, instructions for monitoring the present output frame rate for deviation from a target output frame rate, and instructions for selectively adjusting the quality of future encoded video frames when the present output frame rate deviates from the target output frame rate.

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example, by italics and/or quotation marks. The use of highlighting has no influence on the scope and meaning of a term: the scope and meaning of a term is the same, in the same context, whether or not it is highlighted. It will be appreciated that the same thing can be said in more than one way. One will recognize that "memory" is one form of "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader and should in no way limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The invention claimed is:

1. A computer-implemented method of processing video, comprising:
    receiving a video sequence comprising a plurality of encoded video frames,
        wherein each encoded video frame includes a number of macroblocks and motion vector information associated with the number of macroblocks;
    classifying the number of macroblocks as being one of a background macroblock, a foreground macroblock, and an exempt macroblock,
        wherein, from a perspective of a viewer of the video, the background macroblock appears as being in background and the foreground macroblock appears as being in front of a visual rendering of the video, and
        wherein the classifying operation includes classifying an edge macroblock that is positioned on a peripheral border of a video frame as being an exempt macroblock for which no stabilization is to be performed by a video stabilization stage; and
    providing results of the classifying, along with the video sequence, to the video stabilization stage in which video is stabilized based on the results of the classifying.

2. The method of claim 1, further comprising:
    operating the video stabilization stage only on background macroblocks, while refraining from altering foreground macroblocks and exempt macroblocks.

3. The method of claim 1, further comprising:
    operating the video stabilization stage on background macroblocks, and at least some of foreground macroblocks.

4. The method of claim 1, further including:
    receiving gyro information from a device that captured the video sequence along with the video sequence; and
    wherein the classifying is responsive to the gyro information.

5. The method of claim 4, wherein a given macroblock is more likely classified as a foreground macroblock when the gyro information indicates a higher speed of movement of the device when the foreground macroblock was captured.

6. The method of claim 4, wherein a given macroblock is more likely classified as a background macroblock when the gyro information indicates a lower speed of movement of the device when the foreground macroblock was captured.

7. The method of claim 1, wherein, for a macroblock in the video frame not having an associated motion vector, deciding stabilization based on nearest neighbor macroblock decisions.

8. The method of claim 1, further including:
receiving geographic location information from a device that captured the video sequence along with the video sequence; and
wherein the classifying is responsive to the geographic location information.

9. A computer program product comprising a non-transitory computer-readable medium computer-readable medium that stores processor-executable code, the code comprising instructions for implementing a method of analyzing a video sequence, the instructions comprising:
receiving a video sequence comprising a plurality of encoded video frames, wherein each encoded video frame includes a number of macroblocks and motion vector information associated with the number of macroblocks;
identifying at least a directionality of relative movement between consecutive ones of the plurality of video frames;
associating, using the directionality, a priority of a subsequent video stabilization with at least some of the number of macroblocks, wherein the instructions for associating includes classifying an edge macroblock that is positioned on a peripheral border of a video frame as being an exempt macroblock for which no stabilization is to be performed by the video stabilization stage; and
providing results of the classifying, along with the video sequence, to a video stabilization stage in which video is stabilized based on the results of the classifying.

10. The computer program product of claim 9, wherein the instructions further comprising:
operating the video stabilization stage only on a subset of macroblocks having a specific associated priority.

11. The computer program product of claim 9, wherein the instructions further including:
receiving gyro information from a device that captured the video sequence along with the video sequence; and
wherein the associating is responsive to the gyro information.

12. An apparatus comprising a memory, a processor for analyzing a video sequence, comprising:
module for receiving a video sequence comprising a plurality of encoded video frames,
wherein each encoded video frame includes a number of macroblocks and motion vector information associated with the number of macroblocks;
module for classifying the number of macroblocks as being one of a background macroblock, a foreground macroblock, and an exempt macroblock,
wherein, from a perspective of a viewer of the video, the background macroblock appears as being in background and the foreground macroblock appears as being in front of a visual rendering of the video, and
wherein the classifying module includes classifying an edge macroblock that is positioned on a peripheral border of a video frame as being an exempt macroblock for which no stabilization is to be performed by a video stabilization stage; and
module for providing results of the classifying, along with the video sequence, to a video stabilization stage in which video is stabilized based on the results of the classifying.

13. The apparatus of claim 12, further comprising:
module for operating the video stabilization stage only on background macroblocks, while refraining from altering background macroblocks and exempt macroblocks.

14. The apparatus of claim 12, further comprising:
module for operating the video stabilization stage on background macroblocks, and at least some foreground macroblocks.

15. The apparatus of claim 12, further including:
module for receiving gyro information from a device that captured the video sequence along with the video sequence; and
wherein the classifying is responsive to the gyro information.

16. The apparatus of claim 15, wherein a given macroblock is more likely classified as a foreground macroblock when the gyro information indicates a higher speed of movement of the device when the foreground macroblock was captured.

17. The apparatus of claim 15, wherein a given macroblock is more likely classified as a background macroblock when the gyro information indicates a lower speed of movement of the device when the foreground macroblock was captured.

* * * * *